(12) United States Patent
Dumont et al.

(10) Patent No.: US 7,920,207 B2
(45) Date of Patent: Apr. 5, 2011

(54) VIDEO APPARATUS

(75) Inventors: Frank Dumont, Singapore (SG); Chee Lam Tan, Singapore (SG); Li Bin Cai, Singapore (SG); Qing Jin Zhou, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 1190 days.

(21) Appl. No.: 10/521,385

(22) PCT Filed: Jul. 8, 2003

(86) PCT No.: PCT/EP03/50294
§ 371 (c)(1),
(2), (4) Date: Jan. 18, 2005

(87) PCT Pub. No.: WO2004/008745
PCT Pub. Date: Jan. 22, 2004

(65) Prior Publication Data
US 2005/0248686 A1    Nov. 10, 2005

(30) Foreign Application Priority Data
Jul. 17, 2002   (EP) ..................................... 02291810

(51) Int. Cl.
*H04N 7/00* (2006.01)
*H04N 5/268* (2006.01)
*H03M 1/12* (2006.01)

(52) U.S. Cl. ........ 348/465; 348/500; 348/563; 348/572; 348/706

(58) Field of Classification Search .................. 348/465, 348/572, 563, 564, 500, 705, 706
See application file for complete search history.

(56) References Cited

U.S. PATENT DOCUMENTS

| | | | | |
|---|---|---|---|---|
| 5,327,174 A * | 7/1994 | Kim | | 348/468 |
| 5,493,339 A | 2/1996 | Birch et al. | | |
| 5,557,338 A * | 9/1996 | Maze et al. | | 725/38 |
| 5,671,019 A * | 9/1997 | Isoe et al. | | 348/565 |
| 5,680,176 A * | 10/1997 | Cho | | 348/564 |
| 5,745,184 A | 4/1998 | Neal | | |
| 5,801,785 A * | 9/1998 | Crump et al. | | 348/563 |
| 5,815,216 A * | 9/1998 | Suh | | 348/588 |
| 5,831,591 A * | 11/1998 | Suh | | 715/201 |
| 5,844,615 A | 12/1998 | Nuber et al. | | |

(Continued)

FOREIGN PATENT DOCUMENTS

EP    1069782    1/2001

(Continued)

OTHER PUBLICATIONS

Search Report Dated Sep. 16, 2003.

*Primary Examiner* — Brian Yenke
(74) *Attorney, Agent, or Firm* — Robert D. Shedd; Paul P. Kiel; Guy H. Eriksen

(57) ABSTRACT

A video apparatus has a digital encoder which receives a first analogue video signal with ancillary information in a given time window and generates on an output a digital stream based on the first analogue video signal. A digital decoder is connectable to this output to generate a second analogue video signal. A switch selects between the first analogue video signal and the second analogue video signal as an output depending on a control signal based on the occurrence of said time window.

5 Claims, 3 Drawing Sheets

U.S. PATENT DOCUMENTS

| | | | |
|---|---|---|---|
| 5,914,757 A * | 6/1999 | Dean et al. | 348/584 |
| 5,978,046 A * | 11/1999 | Shintani | 348/589 |
| 6,175,387 B1 * | 1/2001 | Han | 348/565 |
| 6,226,047 B1 * | 5/2001 | Ryu | 348/569 |
| 6,268,887 B1 * | 7/2001 | Watanabe et al. | 348/554 |
| 6,335,763 B1 | 1/2002 | Nishio et al. | |
| 6,384,868 B1 * | 5/2002 | Oguma | 348/564 |
| 6,532,041 B1 * | 3/2003 | Monta et al. | 348/468 |
| 6,556,252 B1 * | 4/2003 | Kim | 348/565 |
| 6,806,909 B1 * | 10/2004 | Radha et al. | 348/384.1 |
| 7,061,544 B1 * | 6/2006 | Nonomura et al. | 348/568 |
| 7,139,032 B2 * | 11/2006 | Unemura | 348/555 |
| 7,231,603 B2 * | 6/2007 | Matsumoto | 715/716 |
| 7,253,843 B2 * | 8/2007 | Lee | 348/565 |
| 2001/0017972 A1 | 8/2001 | Dumont et al. | |
| 2002/0186320 A1 * | 12/2002 | Carlsgaard et al. | 348/468 |
| 2004/0049781 A1 * | 3/2004 | Flesch et al. | 725/37 |
| 2005/0028224 A1 * | 2/2005 | Liu et al. | 725/136 |
| 2005/0238106 A1 * | 10/2005 | Dumont et al. | 375/240.26 |

FOREIGN PATENT DOCUMENTS

| | | |
|---|---|---|
| EP | 1091593 | 4/2001 |
| EP | 1128673 | 8/2001 |
| EP | 1389872 | 2/2004 |
| JP | 8322047 | 12/1996 |
| JP | 2001292401 | 10/2001 |
| WO | WO 01/84837 | 11/2001 |

* cited by examiner

VIDEO APPARATUS

This application claims the benefit, under 35 U.S.C. §365 of International Application PCT/EP03/50294, filed Jul. 8, 2003, which was published in accordance with PCT Article 21(2) on Jan. 22, 2004 in English and which claims the benefit of European patent application No. 02291810.6, filed Jul. 17, 2002.

The invention relates to a video apparatus.

Patent application EP 1 128 673 describes (for instance in FIG. 2c) a video apparatus with a digital encoder generating a digital stream out of analogue video signals and a digital decoder generating analogue video signals based on a digital stream. In this video apparatus, a switch allows connection of the output of the digital encoder to the input of the digital decoder so that incoming analogue video signals successively go through the digital encoder and the digital decoder. This solution provides digital processing of incoming analogue video signals thanks to existing circuits of the video apparatus, and thus without extra cost.

The inventors of the present invention have found that this construction may suffer from some drawbacks in certain circumstances and propose the present invention to get rid of these drawbacks.

Notably, the present invention address a problem which could arise with this solution, as some digital encoders do not take into account some pieces of information included in the incoming analogue video signal, for instance the teletext data in the vertical blanking interval (VBI). Such pieces of information are therefore lost when going through the digital encoder and digital decoder.

The invention notably proposes a video apparatus comprising a digital encoder receiving a first analogue signal with ancillary information in a given time window and generating on an output a digital stream based at least partly on the first analogue signal, a digital decoder at least connectable to the output and generating a second analogue signal, selecting means for outputting the first analogue signal or the second analogue signal based on a control signal, and control means for determining the occurrence of said time window and correspondingly generating the control signal.

According to preferred embodiments:
- the digital decoder includes means for synchronising the second analogue signal to the first analogue signal;
- the means for synchronising the second analogue signal to the first analogue signal are coupled to a synchronisation separator receiving the first analogue signal on an input;
- the control means uses a first signal which is high only during periodical predetermined time intervals corresponding to said time window;
- the first analogue signal is a CVBS signal and said first signal is high during predetermined lines of the first analogue signal;
- the control signal is generated by a combination of the first signal and of a second periodical signal corresponding to active parts of the first analogue signal;
- the first analogue signal is a CVBS signal, said first signal is high during predetermined lines of the first analogue signal and said second periodical signal is high during a determined part of each line;
- the digital encoder and the digital decoder are coupled via a selector coupled to a medium interface;
- the selecting means are coupled to an output of the video apparatus connectable to a display.

The invention also seeks to reduce cross-talk between the incoming and outgoing analogue signals. To this end, the invention also proposes a video apparatus comprising a digital encoder receiving a first analogue signal and generating on an output a digital stream based on the first analogue signal, and a digital decoder receiving the digital stream and generating a second analogue video signal based on the digital stream and synchronised with the first analogue signal.

The invention and other features thereof will be understood in the light of the following description made with reference to the attached drawing where:

In the following description, signals are represented and described as carried on a single wire even if a plurality of wires are needed for the sake of conciseness.

Figure 1:
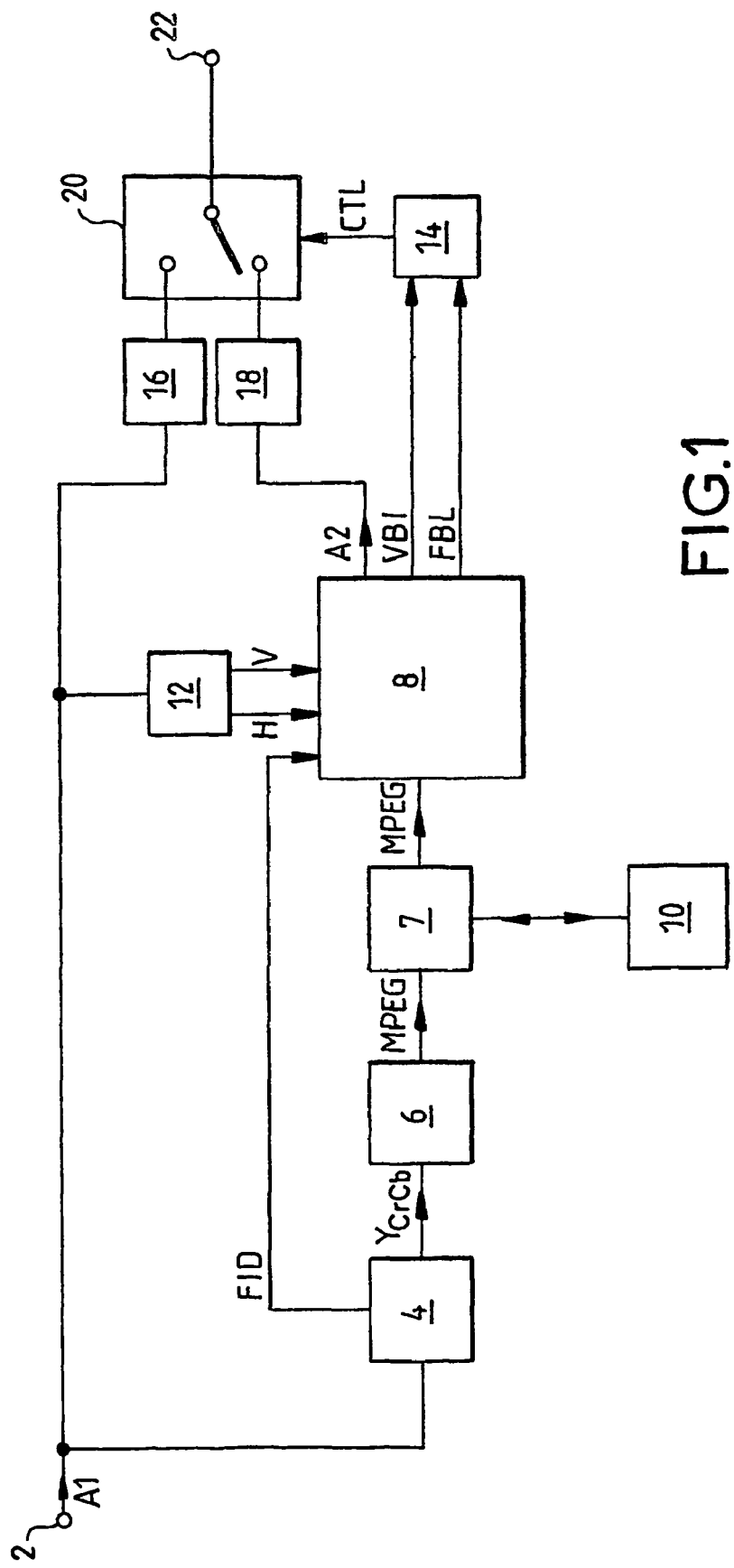
FIG. 1 represents a video apparatus according to the invention.

FIG. 1 represents a video recorder which has the ability to receive analogue video signals and to record them in a digital format, such as MPEG.

A main input 2 carries a first analogue video signal A1, for instance a CVBS signal. (Alternatively, it could be the luminance part Y of a S-Video signal.) The first analogue video signal can be incoming for instance from a tuner and demodulator, or as another example from another video apparatus through a Scart connector.

The first analogue video signal A1 contains ancillary information (for instance some text, a TV-guide, etc.) coded according to a given norm in predetermined periodical time windows. As an exemplary embodiment, VBI data is contained in lines 6 to 22 in odd fields and in lines 319 to 335 in even fields.

The main input is connected to a video decoder 4, for instance Philips SAA7118 that does not process or slice the VBI data but provides raw CVBS samples when VBI data is encountered. The video decoder converts the first analogue video signal 1 into a first digital stream $YC_rC_b$, for instance a 4:2:2 digital stream according to the ITU-R BT.656 standard. The first digital stream $YC_rC_b$ output from the video decoder 4 is input to a MPEG encoder 6 where it is converted into a MPEG digital stream. The MPEG encoder 6 does not process the raw digitised teletext data from video decoder 4.

The MPEG digital stream therefore represents the same video sequence as the first analogue video signal A1, but in a digital format. The output of the MPEG encoder 6 carrying the MPEG digital stream is connected to a selector 7 which is in turn connected on the one hand to a hard disk drive 10 and to a MPEG decoder 8. The hard disk drive 10 is a possible medium interface, but of course other types of medium interface such as DVD-recorder or D-VHS recorder could be used instead.

As explained in EP 1 128 673, the selector 7 allows to connect the MPEG encoder 6 to the hard disk drive 10 and to the MPEG decoder 8 and to connect the hard disk drive 10 to the MPEG decoder 8. The medium interface 10 can thus record on the medium the MPEG stream generated by the MPEG encoder 6, or read the medium and output a MPEG stream to the MPEG decoder 8 in order to play-back a video sequence.

Furthermore, thanks to the selector 7, the MPEG digital stream out of the MPEG encoder 6 can thus be transmitted to the digital decoder 8, for instance a Sti5519 incorporating a MPEG decoder and a video encoder.

In this case, the digital decoder 8 (and particularly its video encoder part) outputs a second analogue video signal A2 (for instance according to the CVBS standard) which represents the same video sequence as the first analogue video signal A1, but with some changes and delay (about 600 ms) due to digital signal processing through circuits 4, 6 and 8.

The digital decoder 8 receives field identification information FID from the video decoder 4. The digital decoder 8 also receives horizontal reference pulses H and vertical reference pulses V from a synchronisation separator 12 which extracts these pulses from the first analogue video signal A1 on main input 2.

By using these horizontal and vertical reference pulses H,V, the video encoder part of the digital decoder 8 generates the second analogue video signal A2 synchronised with the first analogue video signal A1. As the second analogue video signal A2 is delayed compared to the first analogue video signal A1 as already mentioned, this means that, at any time, the first and second analogue video signals A1, A2 define lines having same number but belonging to two different pictures.

Video decoder 4 provides a field identification signal FID to indicate which field is currently received and digitised (odd or even field). In this particular instance, a low level indicates an odd field (Field 1) and a high level indicates an even field (Field 2).

The main input 2 carrying the first analogue video signal A1 is connected to a first input of a switch 20 through a clamping circuit 16. Similarly, the video output of the digital decoder 8 carrying the second analogue video signal A2 is connected to a second input of the switch 20 through a clamping circuit 18. The clamping circuits 16 and 18 allow to have a common black level on the two inputs of the switch 20.

The digital decoder 8 also generates a VBI-occurrence signal VBI and a fast-blanking signal FBL which are transmitted to an AND-gate 14 which in turn generates a control signal CTL controlling the switch 20.

The VBI-occurrence signal VBI is indicative of time windows when the ancillary information should be present in the second analogue video signal A2 according to the norm (line 6 to 22 or line 319 to 335 depending on the field), which correspond to time windows where ancillary information is present in the first analogue video signal A1 as the two signals A1 and A2 are synchronised (see above).

The fast-blanking signal FBL is a line-frequent signal which allows to consider only the active part of the lines, as further explained below.

The control signal CTL resulting from the logical AND combination of the VBI-occurrence signal VBI and the fast-blanking signal FBL is thus indicative of (i.e. high) when VBI data is present in the first analogue video signal A1.

Switch 20 outputs on a main output 22 the clamped second analogue video signal A2 when the control signal CTL is low and the clamped first analogue video signal A1 when the control signal CTL is high. The main output 22 is for instance implemented by pins of a Scart connector to be connected to a display.

The main output 22 thus carries as analogue video signal the digitally-processed video signal with re-inserted VBI data, even if the digital encoder (video decoder) cannot deal with such VBI data.

As previously explained, the VBI data in the video signal on main output 22 is not inserted in the same picture as originally (i.e. in the first analogue video signal A1), but this causes no problem, as VBI data are not accurately related to the picture where they are inserted and as the delay is anyway less than 1 s.

Hence, thanks to this construction, it can be taken advantage both of digital signal processing and of ancillary information with any kind of digital encoder.

Furthermore, as the second analogue video signal A2 (output of digital decoder 8) is synchronised to the first analogue video signal A1 (input of digital encoder 4), cross-talk between these two signals is greatly reduced to the benefit of the quality of the generated pictures.

Figure 2A:
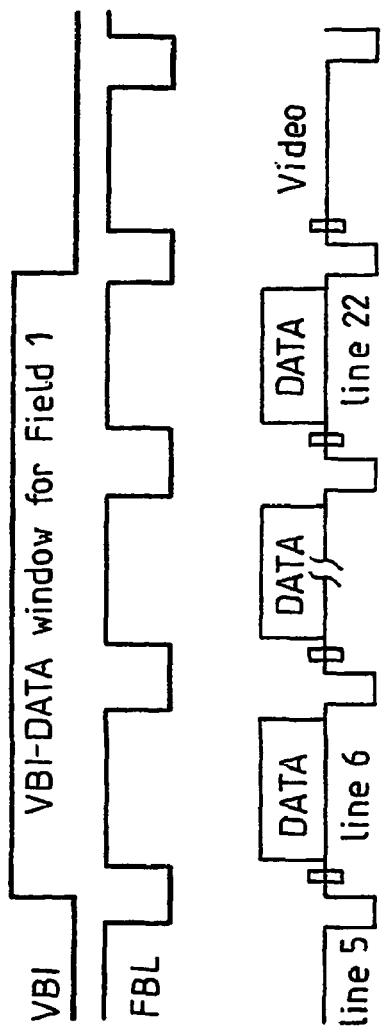
FIGS. 2a and 2b are timing diagrams showing signals used in the invention.
Figure 2B:
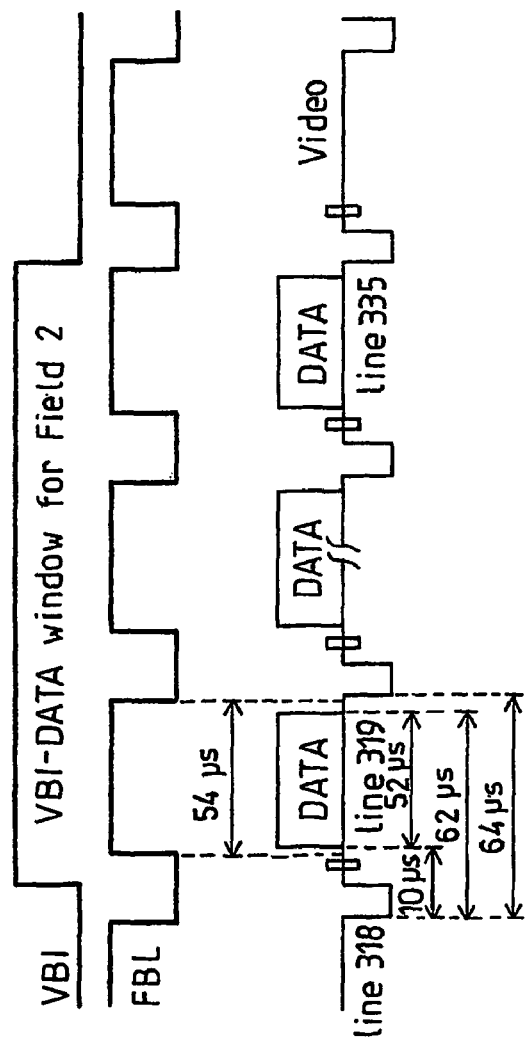

FIGS. 2a and 2b represent timing diagrams of the VBI-occurrence signal VBI, of the fast-blanking signal FBL and of the first analogue video signal A1 respectively in an odd field (Field 1) and in an even field (Field 2).

The VBI-occurrence signal VBI is active (high) for the 17 lines during which the VBI information is present (lines 6 to 22 for odd fields and lines 319 to 335 for even fields), i.e. for a period of 1 088 μs in each field. The fast-blanking signal FBL is high for each line only where data information is present, i.e. during 52 μs out of 64 μs.

By combining the VBI-occurrence signal VBI and the fast-blanking signal FBL in an AND-gate as explained above, the resulting control signal CTL is thus accurately indicative of when VBI data should be present in the second analogue video signal A2 and is present in the first analogue video signal A1, as these two signals are synchronised with each other.

The use of the fast-blanking signal FBL allows to accurately insert in the second analogue video signal A2 only the data information contained in the first analogue video signal A1, and not other parts of the signal, such as colour burst.

In an alternative embodiment of the invention, the VBI-occurrence signal VBI as such could be used as a control signal for switch 20. The insertion of VBI data from the first analogue video signal A1 into the second analogue video signal A2 would then also take place, but this must be done carefully to ensure that the VBI portion from A1 is matched properly to the other video portion of A2 in terms of the black level, H-sync pulse and colour burst. Otherwise, some problems such as line synchronisation may arise when the output video signal is supplied to a TV.

In FIG. 1, the field identification information FID, the horizontal reference pulse H and the vertical reference pulse V are represented as directly input to the digital decoder 8. However, it should be noted that a further circuit for re-shaping these signals could be inserted without departing from the scope of the invention.

Figure 3:
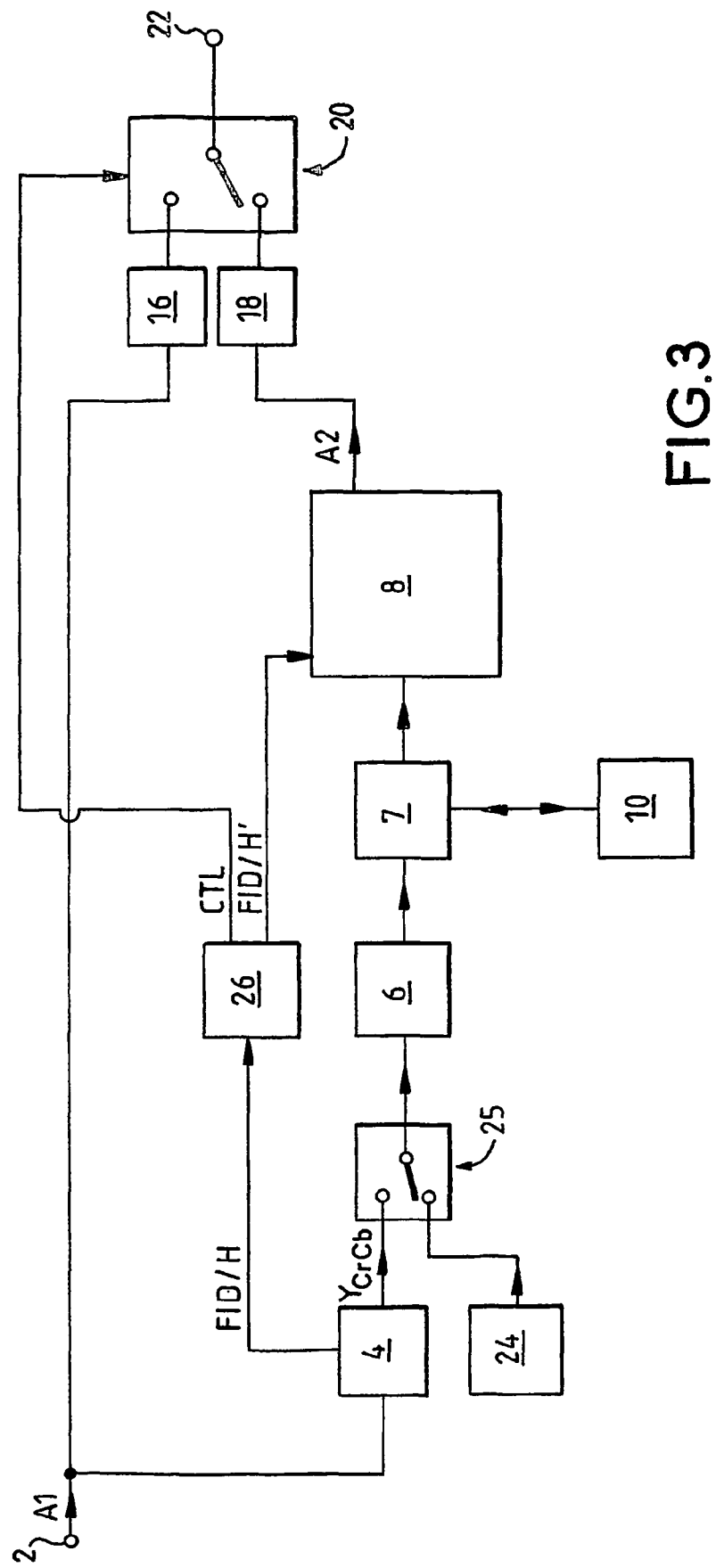
FIG. 3 represents a second possible embodiment of the invention.

An alternative embodiment of the invention is illustrated at FIG. 3. References used in FIG. 1 are kept the same for circuit or signals which are the same or have the same function as in the embodiment of FIG. 1. The main difference in the present embodiment compared to the embodiment of FIG. 1 is that a control circuit 26 is used to generate and send a control signal CTL to the switch 20 based on a combined field identification and horizontal synchronisation signal FID/H received from the video decoder 4.

The control circuit 26 is for instance a FPGA (Field Programmable Gate Array). The generated control signal CTL has a shape corresponding to the shape of the signal CTL in the embodiment of FIG. 1.

The FPGA 20 is also used for re-shaping and time-base correction of the combined signals FID/H and therefore outputs corrected combined signals FID/H' to the digital decoder 8 for synchronisation with the incoming analogue signal A1.

With this construction, as in the first embodiment, the second analogue video signal A2 (generated by the digital decoder 8) is synchronised with the first analogue video signal A1. This means that, even if the video sequence represented by the second analogue video signal A2 is shortly delayed compared to the video sequence represented by the first analogue video signal A1, both signals A1 and A2 represent the same line for display at a given moment in time (but for different fields).

Furthermore, as in the first embodiment, the switch 20 controlled by the control signal CTL allows to insert information from the VBI of the first analogue video signal A1 into the second analogue video signal A2.

It can also be noted that the second embodiment includes a further source of digital stream, here a IEEE 1394 interface 24. The user can select this source of data (via a user interface and a microprocessor of the apparatus) by switching a digital switch 25 to connect the IEEE 1394 interface to the MPEG encoder 6. In this case, the teletext information contained in the VBI of the incoming analogue signal A1 can be inserted in the analogue signal built from the IEEE 1394 digital stream and used by the display to be connected to output 22.

The invention claimed is:

1. Video apparatus comprising:
   an MPEG encoder receiving a first analogue video signal with ancillary information in a given time window and generating, exclusively from said first analogue video signal, on an output a digital video stream based at least partly on said first analogue video signal;
   an MPEG decoder at least connectable to the output and generating a second analogue video signal exclusively from said digital video stream at least when being connected to said output;
   control means for determining the occurrence of said time window and correspondingly generating a control signal;
   selecting means for selectively outputting, based on said control signal, the first analogue video signal, when said time window occurs, and otherwise, the second analogue video signal,
   wherein the MPEG decoder includes means for synchronising the second analogue video signal to the first analogue video signal;
   wherein the control means uses a first signal which is high only during periodical predetermined time intervals corresponding to said time window,
   wherein the control signal is generated by a combination of the first signal and of a second periodical signal corresponding to active parts of the first analogue video signal, and
   wherein the first analogue video signal is a CVBS signal, wherein said first signal is high during predetermined lines of the first analogue video signal and wherein said second periodical signal is high during a determined part of each line.

2. Video apparatus according to claim 1, wherein the means for synchronising the second analogue video signal to the first analogue video signal are coupled to a synchronisation separator receiving the first analogue video signal on an input.

3. Video apparatus according to claim 1, wherein the MPEG encoder and the MPEG decoder are coupled via a selector coupled to a medium interface.

4. Video apparatus according to claim 1, wherein the selecting means are coupled to an output of the video apparatus connectable to a display.

5. Video apparatus comprising:
   a digital MPEG encoder receiving a first analogue signal with ancillary information in a given time window and generating, exclusively from said first analogue signal, on an output a digital stream based at least partly on said first analogue signal;
   a digital MPEG decoder at least connectable to the output and generating a second analogue signal exclusively from said digital stream at least when being connected to said output;
   control means for determining the occurrence of said time window and correspondingly generating a control signal;
   selecting means for selectively outputting, based on said control signal, the first analogue signal, when said time window occurs, and otherwise, the second analogue signal,
   wherein the digital MPEG decoder includes means for synchronising the second analogue signal to the first analogue signal,
   the control means uses a first signal which is high only during periodical predetermined time intervals corresponding to said time window,
   the control signal is generated by a combination of the first signal and of a second periodical signal corresponding to active parts of the first analogue signal, and
   the first analogue signal is a CVBS signal, wherein said first signal is high during predetermined lines of the first analogue signal and wherein said second periodical signal is high during a determined part of each line.

* * * * *